US005854594A

United States Patent [19]
Lin et al.

[11] Patent Number: 5,854,594

[45] Date of Patent: Dec. 29, 1998

[54] REMOTE CONTROLLER FOR CONTROLLING A PLURALITY OF ELECTRIC APPLIANCES

[75] Inventors: James J. Y. Lin, Hsin-Chu; Wu Jui Kuang, Miaoli Hsien; Denny Hwang, Tainan, all of Taiwan

[73] Assignee: Winbond Electronics Corporation, Hsin-Chu, Taiwan

[21] Appl. No.: 739,521

[22] Filed: Oct. 29, 1996

Related U.S. Application Data

[63] Continuation of Ser. No. 306,264, Sep. 14, 1994, abandoned.

[51] Int. Cl.[6] .................... G05B 19/07

[52] U.S. Cl. .................... 340/825.72; 340/825.69; 341/176; 359/146; 359/148; 455/151.4; 455/352; 348/734; 367/199

[58] Field of Search .................... 340/825.37, 325.56, 340/825.69, 825.72, 825.22; 341/176; 359/146, 157, 142, 147, 145, 148; 455/151.1, 151.2, 151.4, 352; 348/734; 367/197, 199

[56] References Cited

U.S. PATENT DOCUMENTS

| | | | |
|---|---|---|---|
| 4,566,034 | 1/1986 | Harger et al. | 340/825.22 X |
| 4,712,105 | 12/1987 | Köhler | 340/825.72 |
| 4,728,949 | 3/1988 | Platte et al. | 340/825.69 X |
| 4,746,919 | 5/1988 | Reitmeier | 340/825.69 |
| 5,132,679 | 7/1992 | Kubo et al. | 340/825.22 |
| 5,410,326 | 4/1995 | Goldstein | 340/825.72 X |
| 5,481,252 | 1/1996 | Kwon et al. | 340/825.69 X |

FOREIGN PATENT DOCUMENTS

| | | | |
|---|---|---|---|
| 5316571 | 11/1993 | Japan | 340/825.22 |

*Primary Examiner*—Brian Zimmerman
*Assistant Examiner*—William H. Wilson, Jr.
*Attorney, Agent, or Firm*—Bacon & Thomas, PLLC

[57] ABSTRACT

A remote controller for independently controlling a plurality of electric appliances includes a selector device for outputting a selected signal for controlling an electric appliance and a memory electrically connected to the selector device for storing a plurality of codes, such codes consisting of device codes, address codes, and function codes, wherein the device codes designate electric appliances of a particular type (such as TV's, VCR's audio sets, etc.), the address codes designate a specific appliance of the particular type (such as TV no.1, TV no. 2, ect.), and the function codes designate control of a function of the appliance (such as volume, picture contrast, color, etc.).

12 Claims, 6 Drawing Sheets

REMOTE CONTROLLER FOR CONTROLLING A PLURALITY OF ELECTRIC APPLIANCES

This is a continuation of application Ser. No. 08/306,264, filed Sep. 14, 1994, now abandoned.

FIELD OF THE INVENTION

The present invention relates to a remote controller, and more especially to a remote controller for remotely controlling electric appliances.

BACKGROUND OF THE INVENTION

A prior art remote controller shown in FIG. 1, is known to be capable of controlling only one electric appliance, and comprises a keyboard array 11, a key encoder 12, a memory 13, an output controller device 14, and an infrared ray Light Emitting Diode (LED) 15. The function of the prior art remote controller is as follows: The remote controller stores a function code corresponding to the television set to be controlled in the memory 13. If any key in the keyboard array 11 is pressed, the memory 13 is informed through the key encoder 12 which key is pressed. The function code is then output from the memory 13 to the output control device 14 to cause the infrared ray LED 15 to emit an infrared ray signal corresponding to the function code. The television set receives and decodes the infrared ray signal to start a function corresponding to the function code, such as channel switching or volume control etc. In the remote controller of the prior art, a starting code is by the output control device 14 directly before the emission of the function code, and similarly an ending code is emitted by the output control device 14 directly after the emission of the function code. The starting code and ending code are used to separate the successive codes caused by successive pressing on the keys.

As described above, it is apparent that the remote controller of the prior art is capable of remotely controlling only one electric appliance and there the deficiencies of the prior art controller are as follows:

1. The remote controller of the prior art is known to be capable of remotely controlling only one electric appliance. Thus, a plurality of different remote controllers are needed if a plurality of different sorts of electric appliances (for example, a television set, audio set, and videocassette recorder) are to be controlled. This results in confusion on the part of the user.
2. Another problem with using it is prior remote controller occurs when the used to remotely control a plurality of electric appliances of one sort. Since every electric appliance uses the same remote controller, all electric appliances might receive and respond to the signal transmitted from any remote controller, and the user is incapable of remotely controlling only one electric appliance at a time.
3. Because the prior art remote controller is only adapted to be used for one electric appliance, the manufacturer must prepare different parts for different remote controllers respectively used to control different electric appliances which makes inventory control difficult and increases costs. For example, a the manufacturer who has received two orders for remote controllers, one order being for 100000 pieces of A remote controllers and the other for 200000 pieces of B remote controllers, will normally prepare enough more parts or materials than are necessary to fulfill the orders, for example by preparing materials for 150000 pieces of A remote controllers and 250000 pieces of B remote controllers, leaving an excess of 50000 pieces for each of the A and B remote controllers as a contingency even if the work for fulfilling the orders is perfectly done. In that case, the occurs that if the client further orders another 100000 pieces of A remote controller. The material for A remote controller is hence insufficient since only 50000 pieces of A remote controller material are at hand. Unfortunately, the remaining material for the B remote controller could not be applied since different electric appliances respectively store different function codes in memory 13. Thus, a purchase of additional parts or materials for A remote controller is necessary, and the remaining parts for B remote controller is wasted. This seriously increases inventory costs and flexibility.
4. Because different remote controllers respectively need different materials or parts, material discrimination for different remote controllers is necessary. This complicates the preparation process of materials and parts.

SUMMARY OF THE INVENTION

It is therefore an objective of the present invention to provide a single remote controller capable of being used to remotely control one or a plurality of different electric appliances.

Another objective of the present invention is to provide a single remote controller for different electric appliances to reduce parts inventory costs.

A further objective of the present invention is to provide a single remote controller for different electric appliances to improve inventory.

In addition, a specific objective of the present invention is to provide a single remote controller without the necessity of parts or materials discrimination for different remote controllers to simplify the parts or materials preparation process.

The present invention relates to a remote controller used to remotely control at least an electric appliance, including a selector device outputting therefrom a selected signal for controlling the electric appliance, a memory electrically connected to the selector device and storing therein a plurality of groups of codes, one group of which corresponds to the electric appliance, and a signal transmitter electrically connected to the memory, receiving from the memory one of the groups of codes, and transmitting an electromagnetic signal corresponding to the one group of codes to the electric appliance.

In accordance with one aspect of the present invention, one of the groups of codes includes a device code, an address code, and a function code wherein the device code represents the type electric appliance, the address code represents a specific one of electric appliances of the same type, and the function that code represents a function the electric appliance is to execute.

In accordance with another aspect of the present invention, the selected signal includes a device code selected signal, an address code selected signal, and a function code selected signal.

In accordance with another aspect of the present invention, the selector device is made up of a keyboard array which includes a plurality of row signal lines, and a plurality of column signal lines wherein an intersection of one of the row signal lines and one of the column signal lines represents a key, a function code encoder electrically connected to the keyboard array for producing a function code selected signal responsive to a specific pressed key, and a device code/address code encoder which includes a device code pin and an address code pin and produces the device code selected signal and an address code selected signal according to the at least one specific row signal line to which the device code pin and the address code pin are connected.

In accordance with another aspect of the present invention, the device code pin and the address code pin of the device code/address code encoder are respectively connected to the at least one specific row signal line by two sliding switches.

In accordance with another aspect of the present invention, the device code pin and the address code pin of the device code/address code encoder determines the device code signal and the address code signal selected by the key.

In accordance with another aspect of the present invention, the device code pin and the address code pin of the device code/address code encoder determines the device code signal and the address code signal selected by a sliding switch and the key.

In accordance with another aspect of the present invention, the device code pin and the address code pin of the device code/address code encoder determines the device code signal and the address code signal selected by an electrical circuit which is a microprocessor.

In accordance with another aspect of the present invention, the memory is a Read Only Memory (ROM) and the electromagnetic signal is an infrared ray signal.

In accordance with another aspect of the present invention, the signal transmitter includes an infrared ray Light Emitting Diode (LED) which emits an infrared ray signal, and an output controller for receiving one group of codes and actuating the infrared ray LED to emit therefrom the infrared ray signal corresponding to the one group of codes. In addition, the electric appliance may, by way of example, be selected from among a television set, an audio set, and a videocassette recorder.

The present invention may be best understood through the following description with reference to the accompanying drawings, in which:

DETAILED DESCRIPTION OF THE PREFERRED EMBODIMENT

Figure 1:
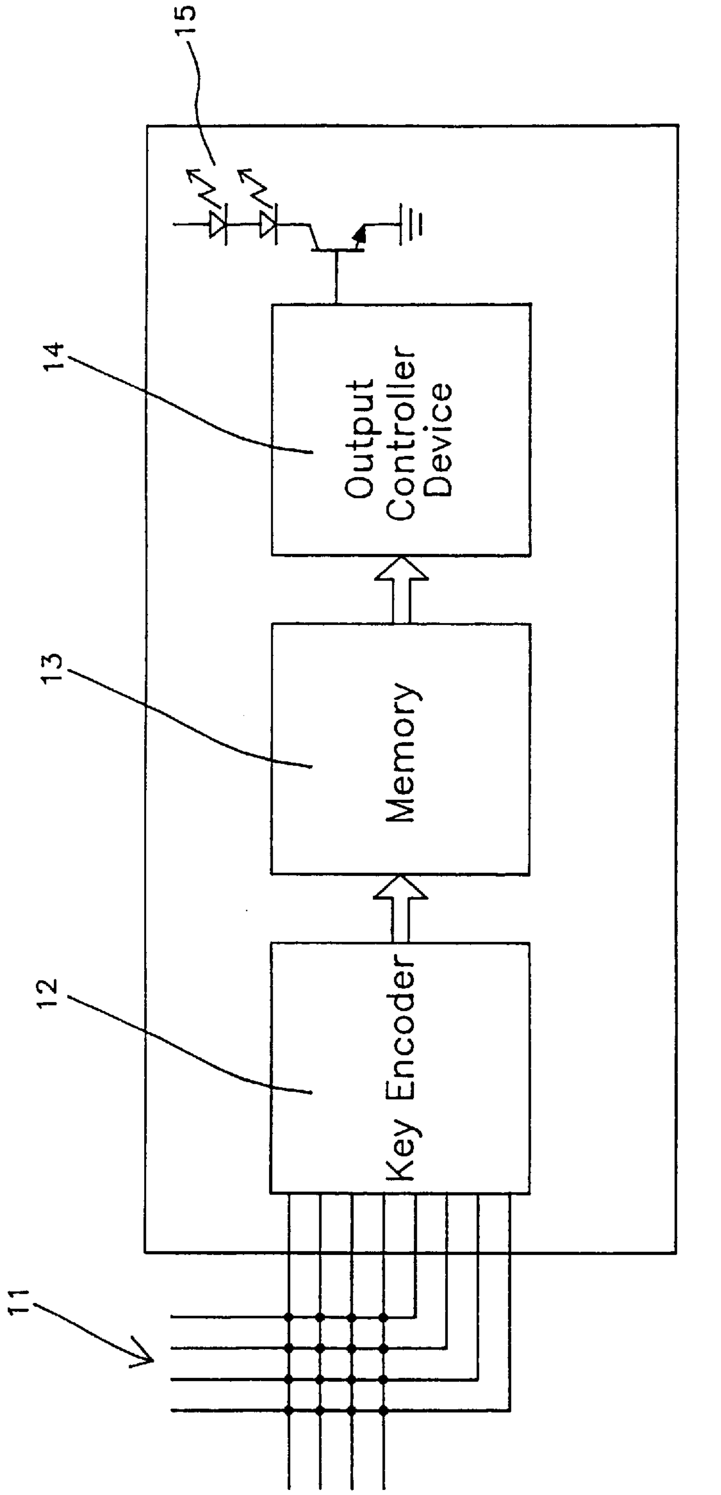
Fig. 1 (PRIOR ART)
FIG. 1 is a schematic block diagram showing a remote controller circuit according to the prior art.
Figure 2:
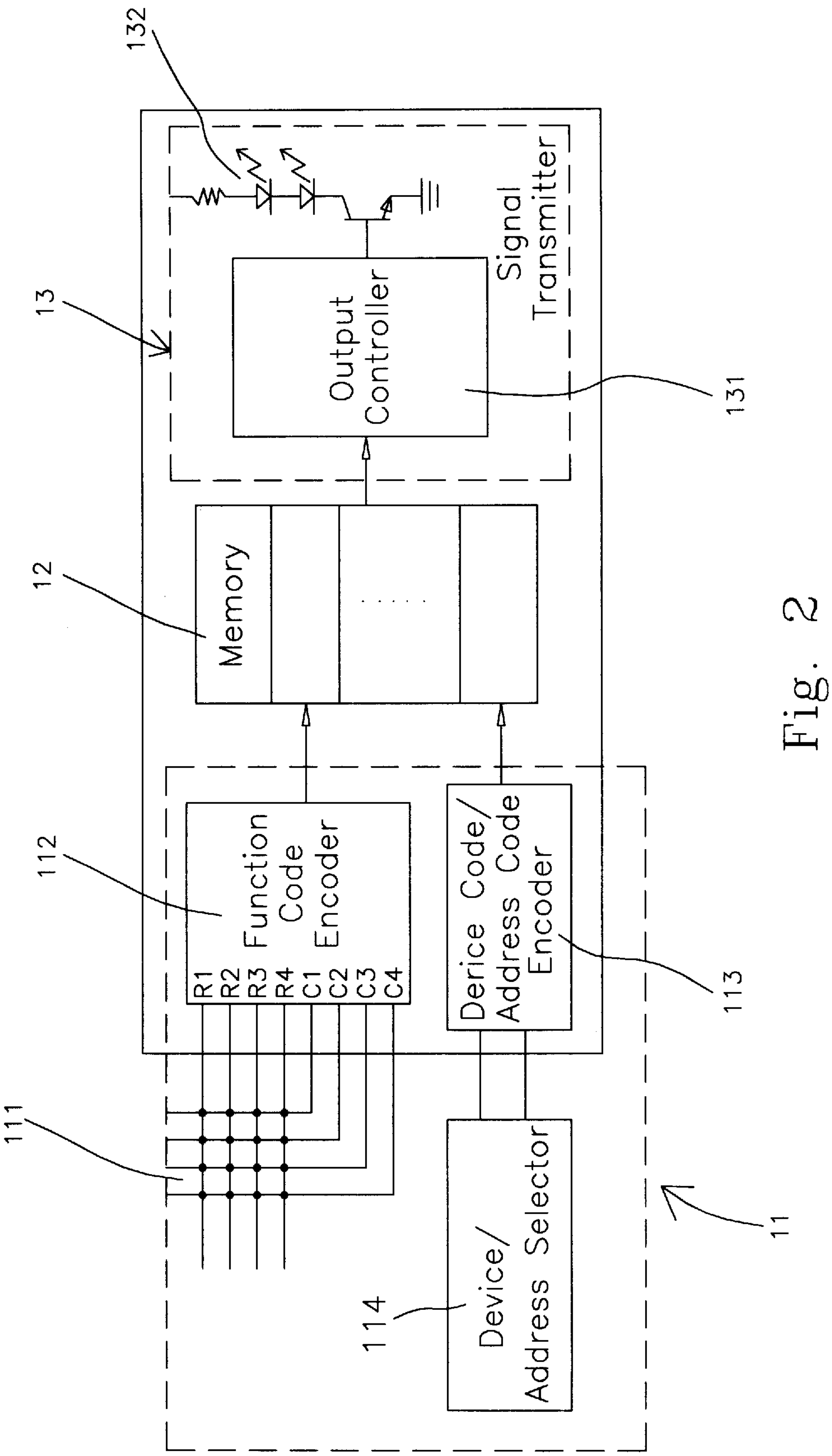
FIG. 2 is a schematic block diagram showing a preferred embodiment of a remote controller circuit according to the present invention.

A preferred embodiment of a remote controller according to the present invention is shown in FIG. 2 and comprises a selector device 11, a memory 12, and a signal transmitter 13. The selector device 11 comprises a keyboard array 111, a function code encoder 112, a device/address selector 114, and a device code/address code encoder 113. The signal transmitter 13 comprises an output controller 131 and an infrared ray LED 132. The type of electric appliance and which one of this type are selected by the device/address selector device 114. After a user selection, the device/address selector 114 causes device code/address encoder 113 to output a device code selected signal and an address code selected signal. Stored in memory 12 (a ROM) are a plurality of groups of codes corresponding to a plurality of specific electric appliances, each group of codes being made up of a device code, an address code, and a function code. For example, if two television sets of the same sort and one audio set are provided, the groups of codes corresponding to the three electric appliances would be as the follows:

TV set No. 1: device code 1, address code 1, function code $a_1 \ldots a_n$ TV set No. 2: device code 1, address code 2, function code $b_1 \ldots b_n$ Audio set No. 1: device code 2, address code 1, function code $c_1 \ldots c_n$, with the device code representing the type of electric appliance; for example, the device code of a television set is different from that of an audio set.

On the other hand, the address code represents a specific one of electric appliances of the same type; for example, the address code of the No. 1 TV set is different from that of the No. 2 TV set. Furthermore, the function code corresponds to a function which the electric appliance is to execute the. No. 1 TV set and No. 2 TV set have the same device code since they are the electric appliances of the same type, while the No. 1 TV set and No. 1 audio set could have the same address code since they are No. 1 electric appliances of different types.

If the memory 12 receives a selected signal and outputs a group of codes in the device "device code 1, address code 1, function code 1", the No. 1 TV set would be the subject appliance to be controlled. The selected signal includes a selected device code signal, address code signal, and function code signal. The generation of the signal could be obtained by one of several methods including the following:

METHOD I

Figure 3:
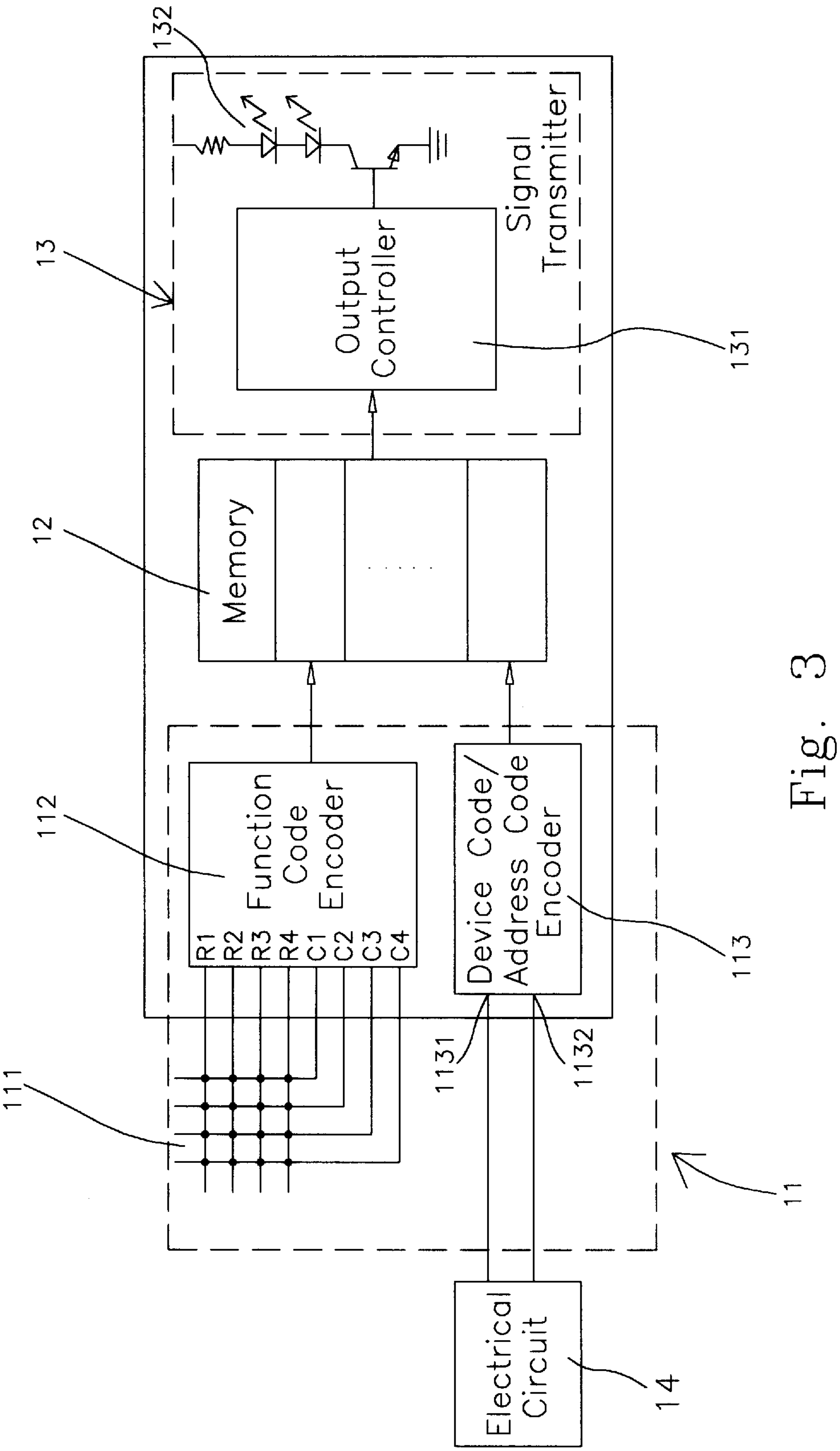
FIG. 3 is a schematic block diagram showing a preferred embodiment of a remote controller determining the device code selected signal and an address code selected signal by an external electrical circuit according to the present invention.

As shown in FIG. 3, an electrical circuit 14 (for example, a microprocessor or other electrical circuit) is used to determine the device code selected signal and the address code selected signal which are output by the device code/address code encoder 113. The memory 12 receives the device code selected signal and the address code selected signal to recognize the appliance to be controlled. In case of a key in the keyboard array 111 being pressed, a message is generated to inform the function code encoder 112 to output a function code selected signal which is then received by the memory 12. Thus, the memory 12 outputs a corresponding group of codes to the output controller 131 according to the device code selected signal, the address code selected signal, and the function code selected signal. Finally, the output controller 131 actuates the infrared ray LED to emit an infrared ray signal corresponding to the group of codes. Hence, an electric appliance is successfully remotely controlled.

METHOD II

Figure 4:
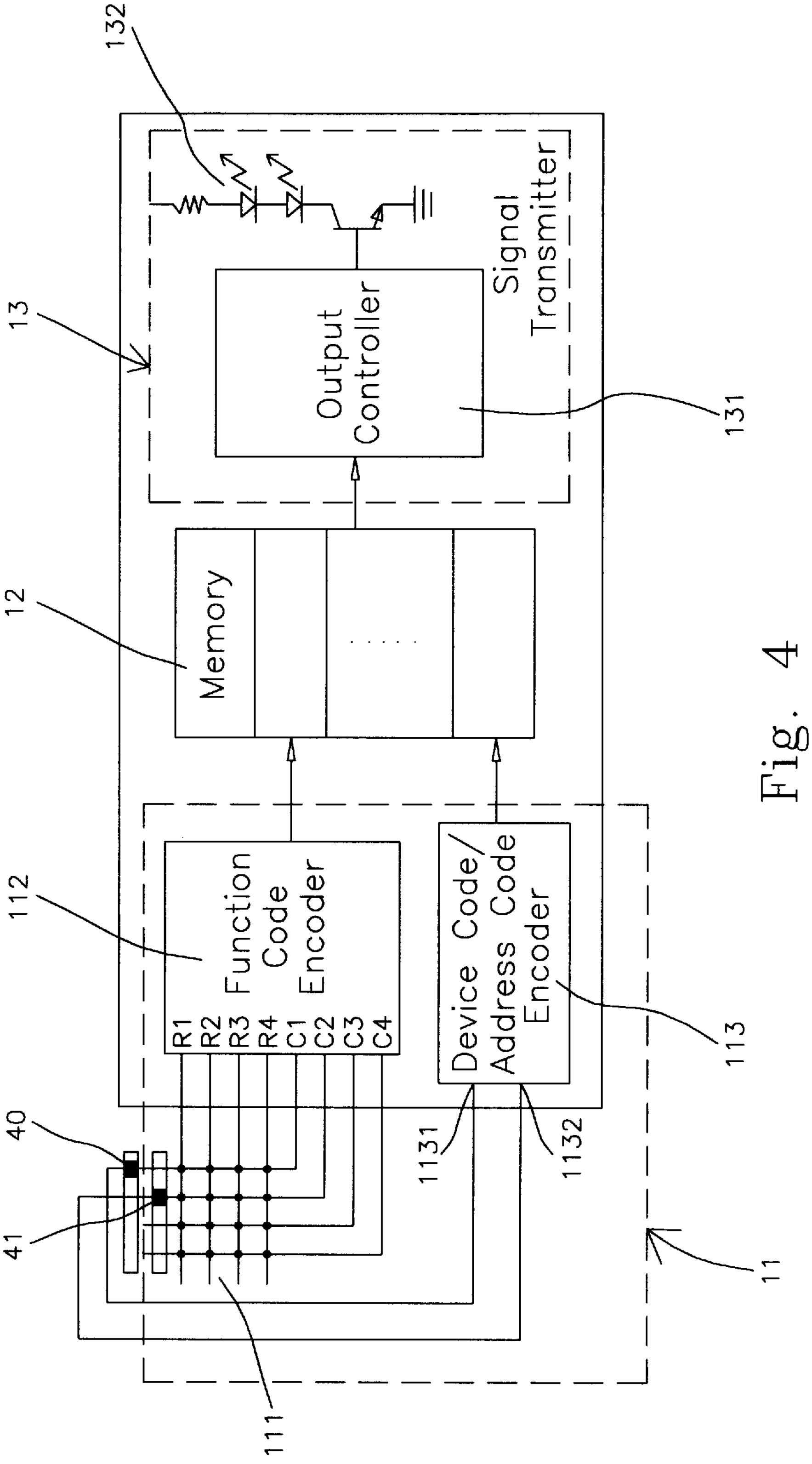
FIG. 4 is a schematic block diagram showing a preferred embodiment of a remote controller determining the device code selected signal and an address code selected signal by two sliding switches according to the present invention.
Figure 5:
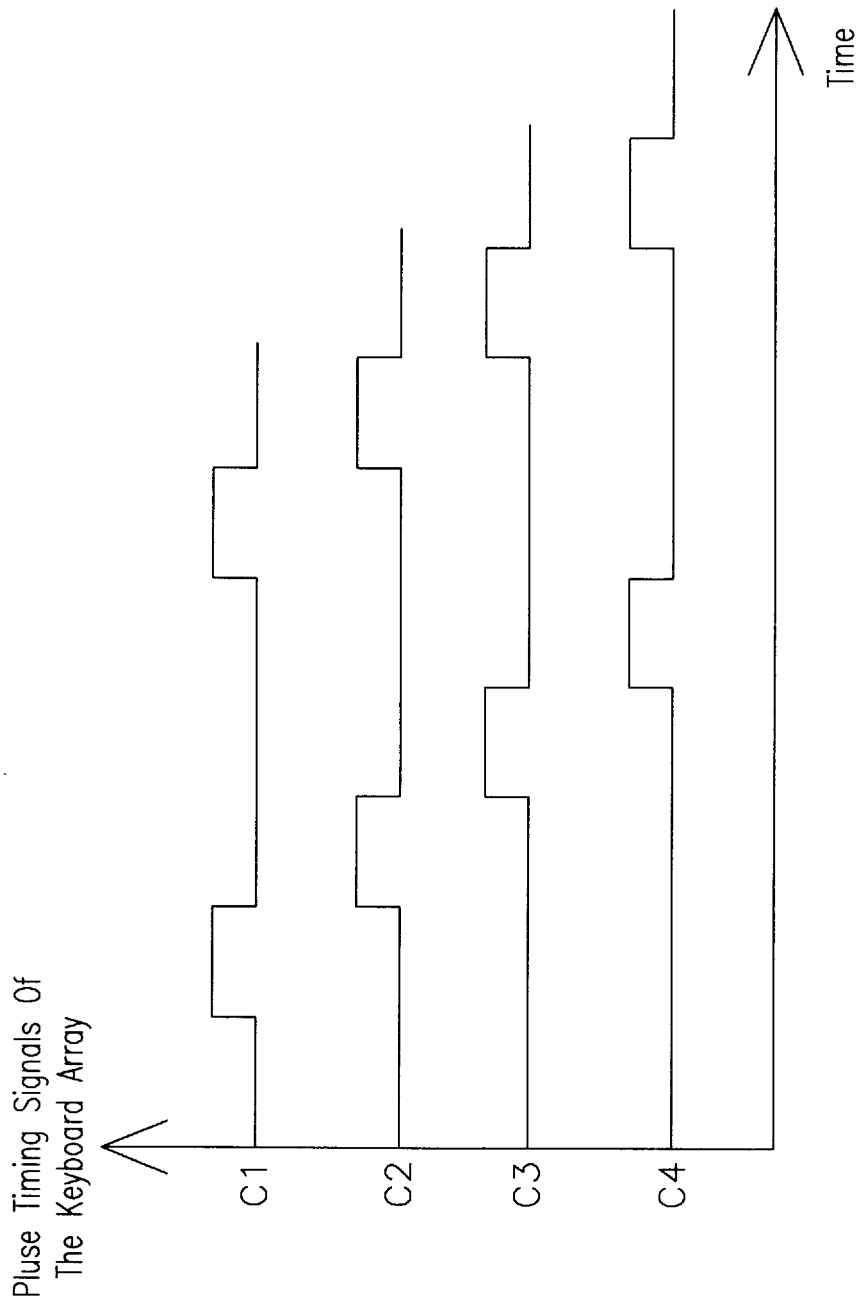
FIG. 5 is a schematic view showing the pulse timing of the keyboard array of a remote controller according to the present invention.

As shown in FIG. 4, the device code pin 1131 is connected to one of the column signal lines of the keyboard array 111, and so is the address code pin 1132. The keyboard array 111 includes four row signal lines R1~R4 and four column signal lines C1~C4. According to the theory of the remote controlling, the column signal lines C1~C4 generates pulse signals periodically (shown in FIG. 5). At one instance, only one of the four column signal lines C1~C4 would be at logic high, and the other three would be logic low. Thus, for example, if the device code pin 1131 is connected to C1, the first type of electric appliance (i.e. the television set in this embodiment) is specified and the memory 12 outputs a device code for the television set. Similarly, if the device code pin 1131 is connected to C2, the second type electric appliance (an audio set) is specified and the memory 12 outputs a device code for the audio set. In like manner, if the address code pin 1132 is connected to C1, the first set of electric appliances is selected and the memory 12 outputs an address code for the first set of electric appliances. Similarly, if the address code pin 1132 is connected to C2, the second set of electric appliances is to be selected and the memory 12 outputs an address code for the second set of electric appliances. The device code pin 1131 is connected by sliding the sliding switch 40 to one of the four column signal lines C1~C4, and the memory 12 receives from the device code/address code encoder 113 a logic high signal which is regarded as the device code selected signal. Similarly, the address code pin 1132 could be connected by sliding the sliding switch 41 to one of the four column signal lines C1~C4 to obtain the address code selected signal. After recognizing the subject electric appliance by the device and address code selected signals, the function code selected signal is generated by pressing a key in the keyboard array 111 to control the subject electric appliance. As a result, the objective of remotely controlling several electric appliances of one or different types by a single remote controller is reached.

METHOD III

Figure 6:
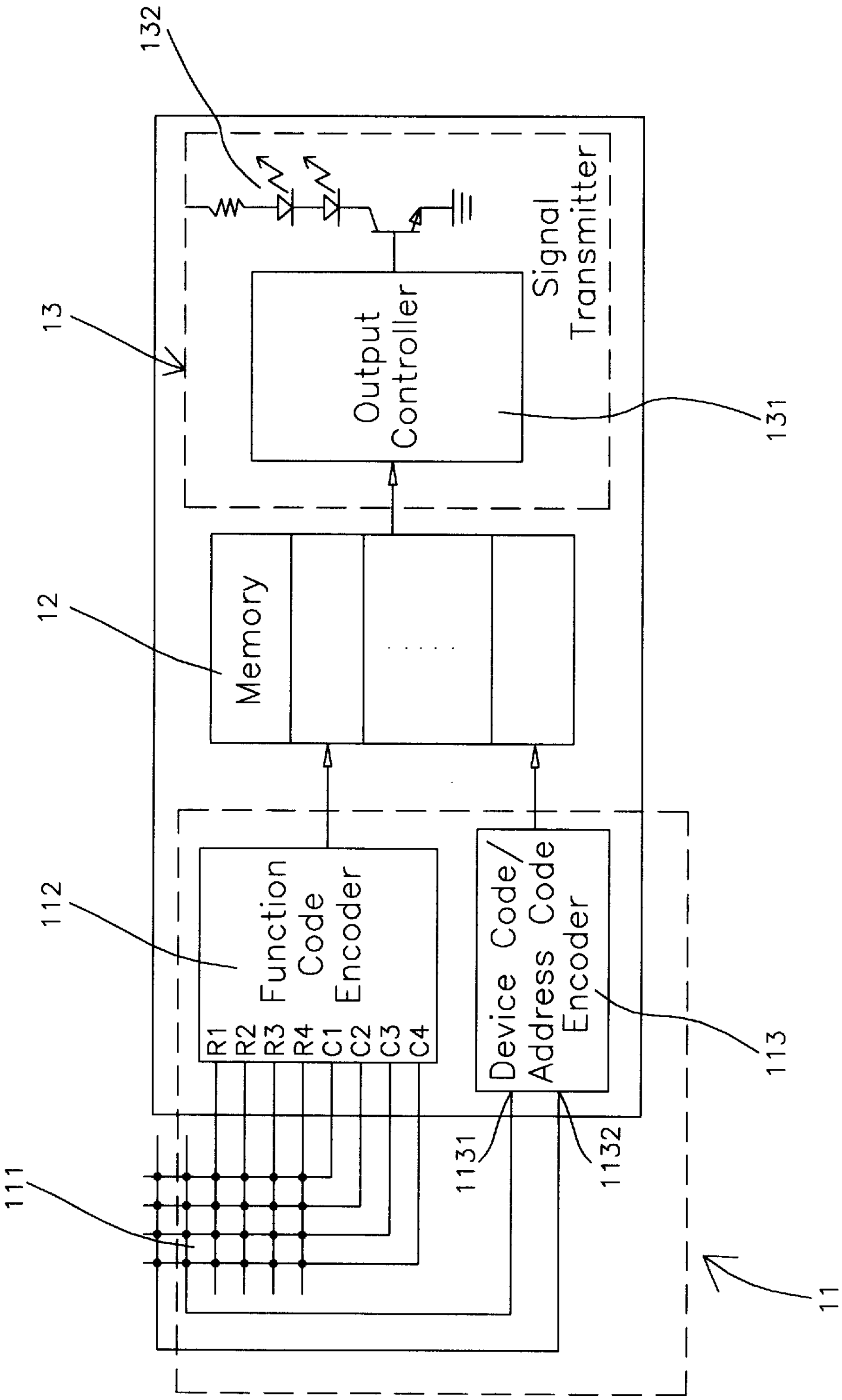
FIG. 6 is a schematic block diagram showing a preferred embodiment of a remote controller determining the device code selected signal and an address code selected signal by a keyboard array according to the present invention.

As shown in FIG. 6, the device code pin 1131 is connected to one of the column signal lines C1~C4, and so is the address code pin 1132. Thus, an additional keyboard array is formed. The device code selected signal and the address code selected signal are generated by the keys in the additional keyboard array, instead of by the sliding switch used in the method of METHOD II. Specifically, when the user presses the key at the intersection of the device code pin 1131 and the column signal line C1, an electric appliance of the first type is selected to be controlled. Likewise, when the user presses the key for the intersection of the device code pin 1131 and the column signal line C2, an electric appliance of the second type is thus selected to be controlled. By the same token, when the user presses the key of the intersection of the address code pin and the column signal line C1, the first one of the electric appliances of the same type is selected to be controlled. Likewise, when the user presses the key of the intersection of the address code pin 1132 and the column signal line C2, the second one of the electric appliances of the same type is selected to be controlled.

METHOD IV

The device code pin 1131 is fixedly connected to one of the column signal lines C1~C4, and so is the address code pin 1132. This is to preset a specific device code selected signal and a specific address code selected signal so that no additional operation is needed to determine these two selected signals and a specific group of codes could be output from the memory 12 once a key in the keyboard array 111 is pressed. This method allows the user to elect to remotely control only one single electric appliance.

In addition, a combination of the sliding switch in METHOD II and the key in METHOD III could also determine the device code selected signal and the address code selected signal.

Moreover, if the device code pin is connected to one of the column signal lines C1~C4 by a sliding switch and the address code pin is fixedly connected to one of the column signal lines C1~C4, several electric appliances of different types could be controlled. Conversely, if the device code pin is fixedly connected to a specific one of the column signal lines C1~C4 and the address code pin is selectably connected to one of the column signal lines C1~C4, several electric appliances of one type could be controlled without confusion.

The output controller 131 receives the group of codes from the memory 12 to cause infrared LED 132 to emit an infrared ray electromagnetic signal which corresponds to the group of codes.

To summarize, the present invention has the advantages following advantages:

1. It uses a device code and an address code in a group of codes to discriminate electric appliances of one or different types so as to control a specific one of the electric appliances of one or different sorts without confusion.
2. All of the electric appliances of one or different types can use the same remote controller. This results in flexibility in the parts supply during manufacture. The connections of the device code pin and the address code pin in the remote controller are determined by the assignment of the clients to meet the specific requirement for controlling the electric appliances of one or different types. This reduces the material stock cost.
3. Since no discrimination requirement for the materials or parts is needed, the preparation process of the material is also simplified.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What we claim is:

1. A remote controller for independently controlling at least two appliances comprising:

a selector configured to transmit a signal which controls a selected appliance, said selector device including:

(a) a memory configured to store:

(i) at least two device codes, each said device code corresponding to a particular type of appliance, thereby enabling a user of the remote controller to independently control said particular types of appliances;

(ii) at least one device code having at least two address codes, each said address code representing a specific appliance of the particular type, thereby enabling the user to independently control said specific individual appliances of each of said particular types; and (iii) each address code having a function code representing a function the selected appliance is to execute, thereby enabling the user to independently control a plurality of functions of each of said selected appliances; and (b) a signal transmitter electrically connected to said memory and configured to transmit an electromagnetic signal which corresponds to the functions of the selected appliance based on the type of appliance selected, and an address of a selected appliance of said selected type.

2. A remote controller according to claim 1, wherein said selected signal comprises a device code selected signal, an address code selected signal, and a function code selected signal.

3. A remote controller according to claim 2, wherein said selector device comprises:

a keyboard array which includes a plurality of row signal lines and a plurality of column signal lines wherein an intersection of one of said row signal lines and one of said column signal lines represents a key;

a function code encoder electrically connected to said keyboard array and producing said function code selected signal responsive to a specific pressed key; and a device code/address code encoder which includes a device code pin and an address code pin and produces said device code selected signal and said address code selected signal according to at least one specific said row signal line to which said device code pin and said address code pin are connected.

4. A remote controller according to claim 3, wherein said device code pin and said address code pin of said device code/address code encoder are respectively connected to said at least one specific row signal line by two sliding switches.

5. A remote controller according to claim 3, wherein said device code pin and said address code pin of said device code/address code encoder determines said device code selected signal and said address code selected signal by said key.

6. A remote controller according to claim 3, wherein said device code pin and said address code pin of said device code/address code encoder determines said device code selected signal and said address code selected signal by a sliding switch and said key.

7. A remote controller according to claim 3, wherein said device code pin and said address code pin of said device code/address code encoder determines said device code selected signal and said address code selected signal by an electrical circuit.

8. A remote controller according to claim 7, wherein said electrical circuit is a Micro Controller.

9. A remote controller according to claim 1, wherein said memory is a Read Only Memory (ROM).

10. A remote controller according to claim 1, wherein said electromagnetic signal is an infrared ray signal.

11. A remote controller according to claim 1, wherein said signal transmitter comprises:

an infrared ray Light Emitting Diode (LED) emitting therefrom said infrared ray signal; and an output controller receiving said one group of codes and actuating said infrared ray LED to emit therefrom said infrared ray signal corresponding to said one group of codes.

12. A remote controller according to claim 1, wherein said electric appliance is one selected from a television set, an audio set, and a videocassette recorder.

* * * * *